March 7, 1939. H. MARUHN 2,149,895
SPRINGING
Filed Sept. 30, 1932  2 Sheets-Sheet 2

H. Maruhn
INVENTOR

By: Marks & Clerk
Attys.

Patented Mar. 7, 1939

2,149,895

UNITED STATES PATENT OFFICE 2,149,895

SPRINGING

Herbert Maruhn, Berlin-Charlottenburg, Germany

Application September 30, 1932, Serial No. 635,672
In Germany October 12, 1931

4 Claims. (Cl. 280—124)

This invention has for its object to improve the effect of the springing of vehicles, the road wheels of which are mounted independently of one another on the frame of the vehicle. It relates more particularly to wheels which are swingingly mounted on the frame, in which case the guiding of the wheels may be effected by leaf springs or by levers (swinging levers).

The supporting springs are interposed between the wheels and the frame of the vehicle and are deformed when these two parts move relatively to one another. The amount of deformation may be different according to the nature of the vertical motions of the wheels.

With the rigid axles mostly employed, the deformation of the supporting springs is in the case of equally directed vertical motions of the pair of wheels with respect to the frame greater than in the case of equally great vertical motions which are however oppositely directed. On the other hand, with swinging axles of the ordinary kind with independent springing the deformation of the supporting springs is equally great for both kinds of motion. Hence, in the two constructional forms the effect of the springing differs greatly.

Assuming for both constructional forms an equally hard springing for equally directed vertical motions of the pair of wheels, the independent springing of the pivoted axles will be subjected in the case of oppositely directed vertical motions to greater deformations and therefore transmit greater forces to the frame than the springing of the rigid axles. The consequence of this is, that with this kind of motion the springing effect of the independent springing appears very hard and that the frame is subjected to considerably greater torsional stresses, that is to say, more powerful twisting about its longitudinal axis.

According to the invention it becomes possible, even with wheels swingingly attached to the frame, to obtain deformations of the springs, the extent of which is different with equally directed and oppositely directed vertical motions of the pair of wheels, and consequently a similar springing effect as in the case of rigid axles.

For this purpose the total springing arrangement of the swingingly mounted pair of wheels is divided into two groups, of which one is capable of moving with respect to the vehicle frame and for example is pivoted to the frame in the longitudinal central plane of the vehicle and the other is fixed rigidly to the frame. This latter springing arrangement which is fixed to the frame may consist of any suitable elastic members, such as springs or rubber buffers. The effect of the total springing arrangement of the pair of wheels depends on the hardness of the two separate groups, one group consisting for instance of a plurality of springs or of a single spring.

Further details of the invention may be gathered from the drawings, in which.

Figure 1:
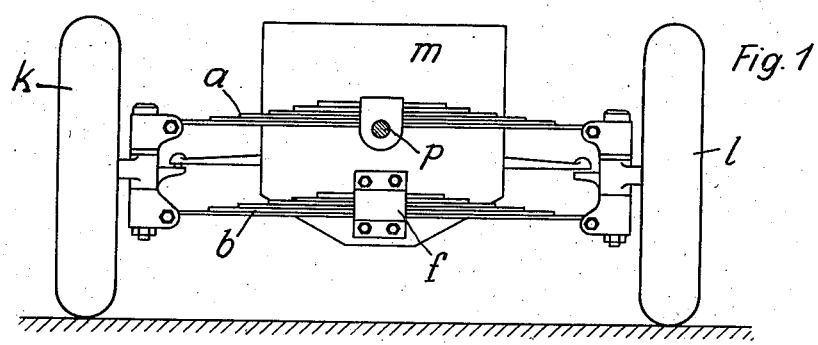
Figure 1 shows one form of the invention.
Figure 2:
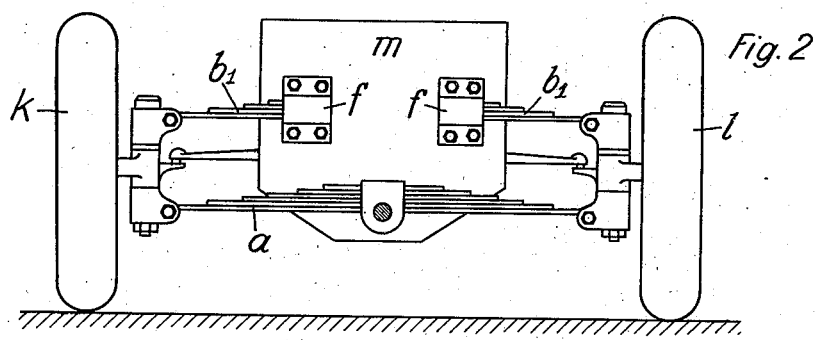
Figure 2 shows a modification of the form shown in Figure 1.
Figure 3:
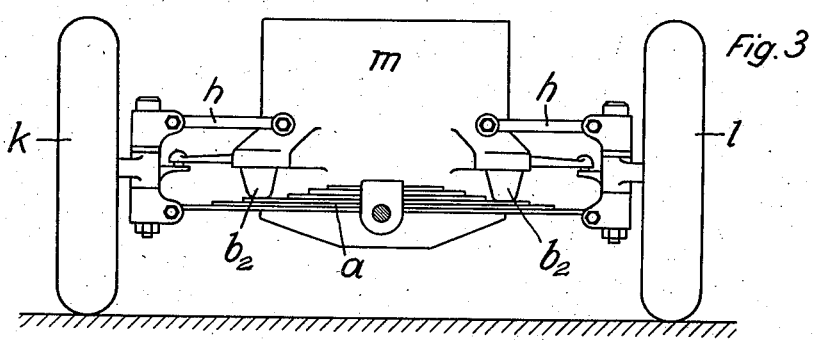
Figure 3 shows a second modification.

In Figures 1, 2 and 3, the invention is shown applied to the steering axle of a vehicle.

In Fig. 1 the mass of the frame $m$ is supported by the springs $a$ and $b$ with respect to the road wheels $k$ and $l$ of the vehicle. The wheels are supported by the springs so as to swing on the frame of the vehicle. The lower spring $b$ is fixed in $f$ to the vehicle frame, while the upper spring $a$ is mounted so as to be capable of turning about the pin $p$ in the longitudinal central plane of the vehicle.

When the wheel $k$, for instance, moves upwards by a certain amount with respect to the frame $m$ and the wheel $l$ moves downwards by the same amount, in other words, when the pair of wheels performs oppositely directed vertical motions, only the spring $b$ will bend, while the spring $a$ will turn around $p$. When, on the other hand, both the wheels, $k$ and $l$, move upwards or downwards with respect to the frame $m$, in other words, when the pair of wheels performs equally directed vertical motions, both springs, $a$ and $b$, will be bent. According to the nature of the motion of the two wheels the deformation of the total springing arrangement is therefore different, just as in the case with the springing of rigid axles.

Figure 4:
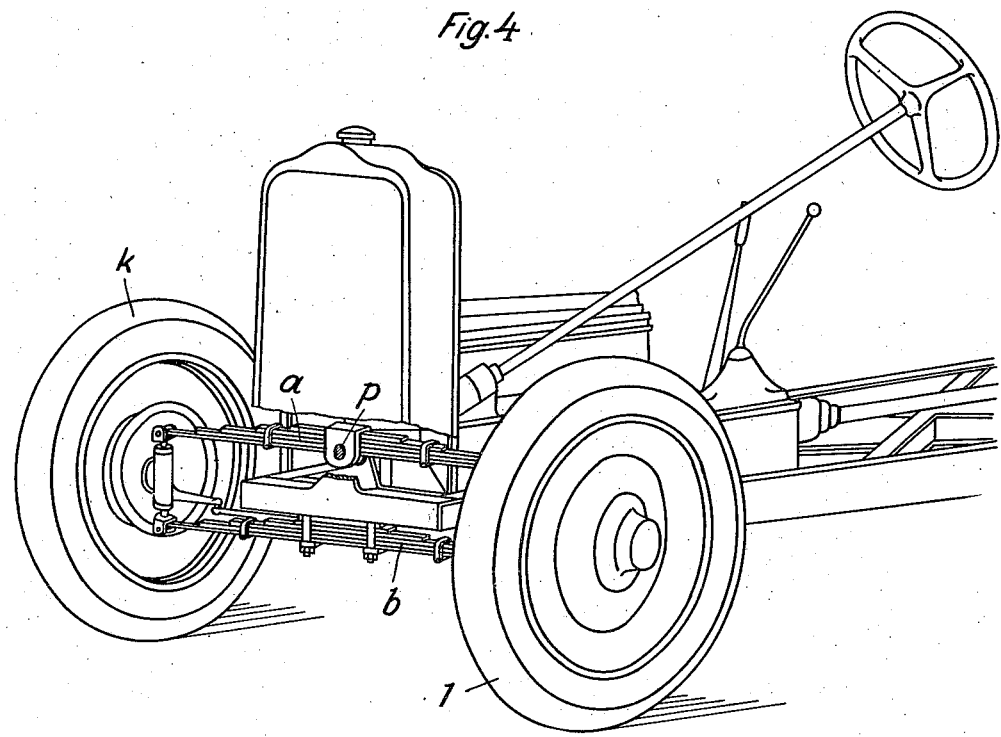
Figure 4 is a slight modification of the device shown in Figure 1.

Fig. 4 shows the same example in greater detail and in a slightly modified form from Figure 1, as applied to the front axle of a power-driven vehicle.

Fig. 2 shows a constructional example in which the spring $a$ which is pivoted in the longitudinal central plane of the vehicle lies at the bottom. The clamped spring $b_1$ consists of two half springs which are fixed in $f$ to the frame.

Fig. 3 shows a further example, in which the road wheels $k$ and $l$ are connected to the frame by the links $h$ and the pivoted spring $a$. The clamped springs are replaced by two rubber buffers $b_2$ which are fixed to the frame.

The present invention is of course not limited to the examples shown and described, for obviously the arrangement is applicable to other constructions in which the wheels are pivotally mounted on the frame.

What I claim is:

1. A springing arrangement for a pair of wheels of a power-driven vehicle, which are so attached to the frame of the vehicle as to be capable of swinging with respect thereto, comprising a plurality of resilient means of which one portion is fixed to the vehicle frame and the other portion is rotatably journalled to the frame in the longitudinal central plane of the vehicle, as set forth.

2. A springing arrangement for a pair of wheels of a vehicle having a frame, comprising transverse springs by which the wheels are so attached to the vehicle frame as to be capable of swinging with respect thereto, of which two half springs are fixed to the vehicle frame and an additional spring is rotatably journalled to the vehicle frame in the longitudinal central plane of the vehicle, as set forth.

3. A spring construction for a wheel vehicle, comprising a vehicle frame and resilient supports for the frame, one support above the other, and one of the said resilient supports being rigidly attached to the frame and the other, attached to the frame movably in response to load in the longitudinal central plane of the frame.

4. In a spring construction for a vehicle frame carried by a pair of wheels with mountings therefor, means for attaching the wheels and mountings to the frame of the vehicle so as to be capable of swinging with respect thereto, said means comprising a spring non-rotatably fixed with the vehicle frame and secured to the wheel mountings, and an independent spring connecting the wheel mountings and pivotally connected to the vehicle frame.

HERBERT MARUHN.